United States Patent [19]
Timmerman et al.

[11] 4,022,622
[45] May 10, 1977

[54] DISPERSING POLYMERIC PARTICLES IN AQUEOUS MEDIUM FOR COATING SILVER HALIDE EMULSION LAYERS

[75] Inventors: Daniël Maurice Timmerman, Mortsel; Victor Jan Thijs; Walter Frans De Winter, both of Berchem; Frans Henri Claes; Hubert Vandenabeele, both of Mortsel, all of Belgium

[73] Assignee: AGFA-GEVAERT N.V., Mortsel, Belgium

[22] Filed: Mar. 1, 1976

[21] Appl. No.: 662,420

Related U.S. Application Data

[62] Division of Ser. No. 408,491, Oct. 23, 1973, Pat. No. 3,941,727.

[30] Foreign Application Priority Data

Nov. 22, 1972 United Kingdom ............. 53896/72

[52] U.S. Cl. .................................. 96/67; 96/50 PL; 96/87 R; 96/87 A; 96/84 R
[51] Int. Cl.² .................... G03C 1/76; G03C 1/78
[58] Field of Search ............ 267/8, 17 A, 29.6 PN, 267/29.6 R, 29.6 RW, 29.6 RB, 29.6 PM, 17.49 T, 89.5 AW, 92.8 W, 93.5 W; 96/67, 68, 87 R, 50 PL, 87 A, 84 R

[56] References Cited

UNITED STATES PATENTS

| | | | |
|---|---|---|---|
| 2,171,765 | 9/1939 | Röhm et al. | 260/89.5 |
| 3,110,695 | 11/1963 | Ceresa | 260/89.5 |
| 3,143,532 | 8/1964 | Kahrs et al. | 260/89.5 |
| 3,663,665 | 5/1972 | Sturt | 260/29.6 |
| 3,784,491 | 1/1974 | Pozorski | 260/8 |
| 3,811,924 | 5/1974 | Gallagher et a. | 96/67 |
| 3,856,526 | 12/1974 | Hamb et al. | 96/67 |
| 3,867,153 | 2/1975 | MacLachlan | 96/67 |
| 3,895,949 | 7/1975 | Akamatsu et al. | 96/67 |

*Primary Examiner*—Jack P. Brammer
*Attorney, Agent, or Firm*—A. W. Breiner

[57] ABSTRACT

Polymeric particles are homogeneously dispersed in aqueous medium by a process which comprises dissolving a water-insoluble film-forming polymer in a water-insoluble, ethylenically unsaturated monomer which is liquid at room temperature. The solution formed is dispersed by stirring in an aqueous solution of a hydrophilic colloid and of a dispersing agent, stirring being continued until a stable dispersing of polymer-in-monomer solution droplets having a diameter between 1 and 10 microns, preferably between 1 and 6 micron, in said aqueous solution is obtained. While continuously stirring the dispersion in the presence of a free-radical forming polymerization initiator, the dispersion is heated at the decomposition temperature of said polymerization initiator to effect polymerization of the water-insoluble, liquid monomer and to form an aqueous dispersion of solvent-free polymer particles.

The homogeneously dispersed polymer particles are used in hydrophilic coating compositions as matting agents, particularly in protective layers for photographic materials formed of these hydrophilic coating compositions.

11 Claims, 1 Drawing Figure

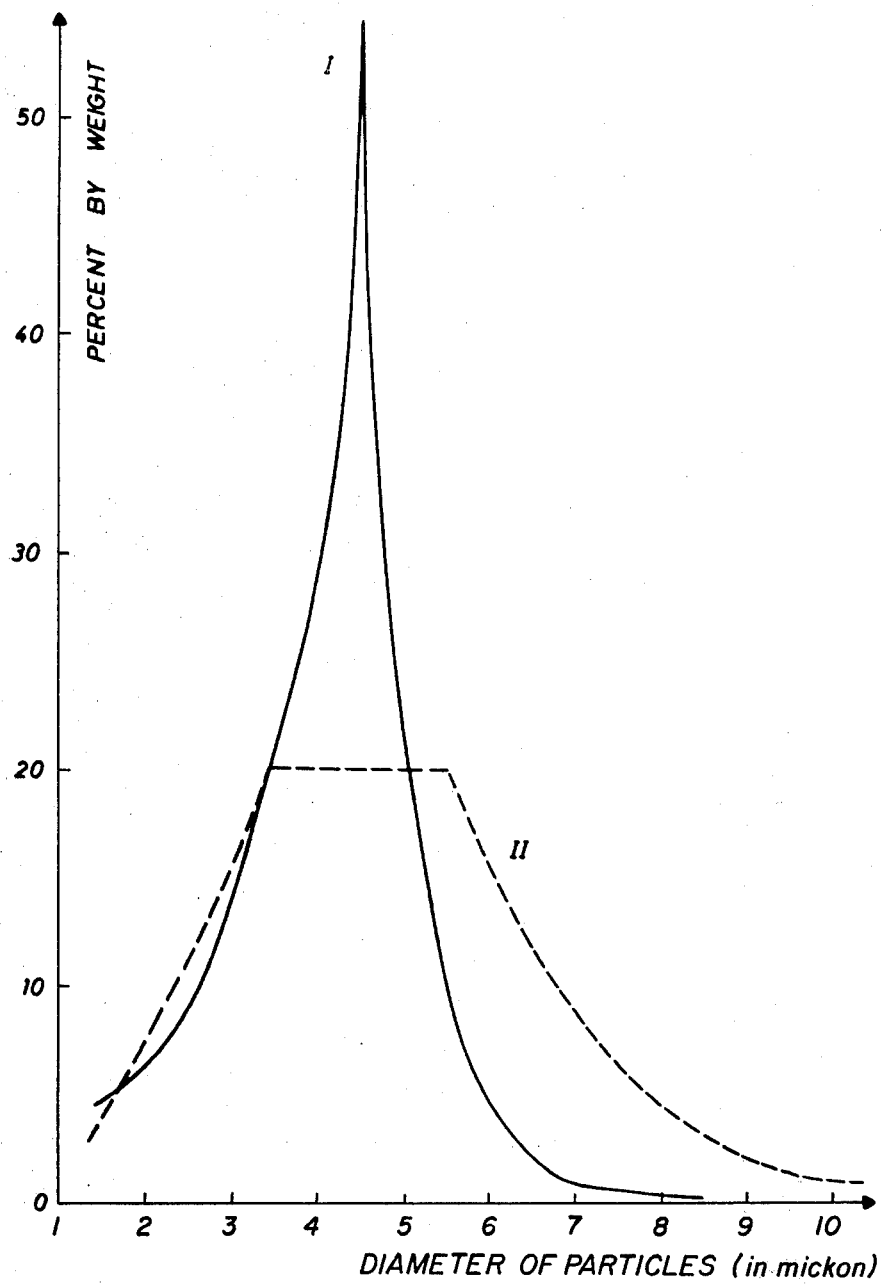

DISPERSING POLYMERIC PARTICLES IN AQUEOUS MEDIUM FOR COATING SILVER HALIDE EMULSION LAYERS

This is a division of application Ser. No. 408,491 filed Oct. 23, 1973 now U.S. Pat. No. 394,1727.

The invention relates to a process for homogeneously dispersing polymeric particles in aqueous medium, to hydrophilic coating compositions comprising these homogeneously dispersed polymer particles as matting agents and particularly to photographic materials comprising protective layers formed of these hydrophilic coating compositions.

It is generally known in the photographic art to use light-sensitive silver halide materials containing as matting agents finely divided silica particles in the outer layer. Silica particles are incorporated as matting agents into the outer layer of photographic material for all kinds of purposes. For instance, it has been proposed to include finely divided silica particles in the outer layer of photographic material in order to reduce the sticking tendency of said material, e.g. when the material is to be stored or packed in the form of a roll or stack. The roughness produced by the silica particles at the surface of the photographic material gives a matted appearance to the material and also prevents the generation of static electricity, which causes sparks and thus exposure of the photographic light-sensitive layer as well as the formation of Newton's rings during printing and enlarging operations, because the contact surface of said material with another material is relatively small. Further, the outer layer with silica particles also considerably decreases abrasion by dryfriction and reduces the tendency of scratching when materials are stored or packed in contact with other material, as is the case e.g. with X-ray material packed without interleaves (non interleaved fold-scratching).

However, the use of silica particles in a surface coating, e.g. a protective coating, applied to the light-sensitive silverhalide emulsion layer of photographic material, also presents a number of drawbacks. For instance it has been observed that the presence of silica particles in a protective hydrophilic colloid surface coating of a photographic material produces an objectionable slightly milky appearance, which is undesirable, especially in transparent photographic materials.

It has also been proposed to use finely divided cellulose or derivatives thereof as a matting agent. In this case it is essential that the cellulose or derivative thereof be comminuted mechanically or chemically to the required grain size, which involves tedious additional measures.

Hydrophobic polymers may be dissolved in an organic solvent and this solution dispersed in water containing a hydrophilic colloid such as gelatin. Upon evaporation of the organic solvent interesting dispersions can be formed having a particle size as required for matting agents. The disadvantage of this process is the almost unavoidable presence of residual amounts of organic solvent, which gives rise to undesired agglomeration of the polymer particles.

It is further known that very fine dispersions of polymeric materials are obtained when the polymers are formed according to an emulsion polymerisation process. The particle size of emulsion polymer particles, however, is always less than 0.5 micron, and on the average less than 0.1 micron, which makes them inappropriate for use as matting agents.

As a result thereof the particle size of the majority of the matting agents so far proposed is either too small or their grain size is too coarse and consequently an undesirable clouding is formed on the surface of the photographic layer, to which they are applied.

It is an object of the invention to provide a process for the preparation of homogeneously dispersed polymeric particles, which are suitable for use as matting agents in hydrophilic coating compositions.

According to the invention a process is provided for homogeneously dispersing polymeric particles in aqueous medium, which process comprises, dissolving a water-insoluble film forming polymer in a water-soluble, ethylenically unsaturated monomer, which is liquid at room temperature, dispersing by stirring the solution thus formed in an aqueous solution of a hydrophilic colloid and of a dispersing agent, the stirring being continued until a stable dispersion of polymer-inmonomer solution droplets having a diameter between 1 and 10 micron, preferably between 1 and 6 micron, is formed in said aqueous solution, and while continuously stirring the dispersion in the presence of a free-radical forming polymerisation initiator, heating the dispersion to the decomposition temperature of said polymerisation initiator to effect polymerisation of said water-insoluble, liquid monomer and to form an aqueous dispersion of solvent free polymer particles.

The ethylenically unsaturated monomer, in which the hydrophobic polymer is dissolved, has dissolved, has to meet several requirements. First, it has to be liquid at room temperature and to be insoluble in water so that it can be dispersed easily in water. This does not mean that the monomer has to be totally insoluble in water, but that its solubility in water has to be so low that it can be neglected practically. Indeed, methyl methacrylate, styrene, and acrylonitrile are generally known to be insoluble in water, although at 40° C 1.43%, 0.03%, and 7.9% respectively by weight of them are dissolved.

Further the monomer used has to be a solvent at room temperature for the water-insoluble film-forming polymer and upon polymerisation, possibly together with the hydrophobic polymer it should produce relatively hard polymer particles having a glass transition temperature of at least 60° C.

This lower limit of 60° C for the glass transition temperature is determined by the polymerisation conditions and the necessary physical properties of the matting layer.

As to the polymerisation conditions it is generally known that the minimum temperature, at which the polymerisation can be carried out, depends on the nature of the polymerisation initiating agent used. If low temperature types are used, the lowest polymerisation temperature is comprised between 30° and 50° C, whereas with high temperature types 100° C can be exceeded.

On the other hand the polymerisation is to be carried out in the presence of a hydrophilic colloid, preferably gelatin. The use of such a natural product places further restrictions on the temperature range, in which the polymerisation can be carried out and reduces it to 40°–80° C. Indeed below 40° C a very important increase in viscosity of the aqueous solution of the hydrophilic colloid is observed, whereas a heating beyond 80° C gives rise to a quick lowering of the viscosity of the solution due to hydrolytic degradation of the gelatin. As will be demonstrated further on this is associated in the first case with the formation of far too small particles and in both cases to agglomeration of the particles during the polymerisation.

As to the physical properties of the matting layer to be formed the latter layer must not be sticky at the common processing temperatures. If e.g. polymers with a glass transition temperature of approximately 40° C are formed, the polymerisation should necessarily be initiated beneath 40° C, since otherwise agglomeration of the polymer particles would take place as a result of sticking.

In order to avoid all this, the monomer and the hydrophobic polymer have to be selected in such a way, that the particles obtained after dispersion and polymerisation possess a sufficient hardness, which is attained when the polymer particles have a glass transition temperature of at least 60° C and preferably higher than 80° C.

Suitable water-insoluble ethylenically unsaturated monomers that are liquid at room temperature and the polymers of which possess a glass transition temperature above 60° C are e.g. styrene, o- and p-chlorostyrene, vinyl toluene, α-methylstyrene, methyl methacrylate, isopropyl methacrylate, tert.butyl methacrylate, vinylidene chloride and acrylonitrile.

The water-insoluble spolymer has to be soluble in the ethylenically unsaturated monomer used and its molecular weight has to be sufficiently high to procure film-forming properties. Molecular weights of at least 10,000 are in general required.

Suitable hydrophobic polymers for the process of the invention are polystyrene, polyvinyl toluene, poly-α-methyl styrene, copolymers of styrene and methyl methacrylate, vinyl toluene, acrylonitrile and α-methyl styrene, poly-o-chlorostyrene, poly-p-chlorostyrene, mixtures of poly-o-chlorostyrene and poly-p-chlorostyrene and their copolymers with styrene, α-methyl styrene, vinyl toluene, methyl-, isopropyl-, and tert. butyl methacrylate and acrylonitrile, further esters of polymethacrylic acid with methanol, isopropanol and tert. butanol and their mutual copolymers, the copolymers of methyl methacrylate and ethyl acrylate comprising at most 30% by weight of ethyl methacrylate, and the copolymers of methylmethacrylate, and acrylonitrile comprising less than 20% by weight of acrylonitrile.

The viscosity of the solution of hydrophobic polymer in a given liquid monomer will depend on the molecular weight of the polymer. So it is obvious that this viscosity will be higher with increasing molecular weight. As described hereinafter the viscosity has a great influence on the possible agglomeration of the polymer particles and on the general size of these particles.

The solution of hydrophobic polymer in water-immiscible liquid monomer, which will be named polymer-in-monomer solution hereinafter, is dispersed in an aqueous solution of a hydrophilic colloid, such as gelatin, polyvinyl alcohol, polyvinyl pyrrolidon, or polyethylene oxide, this solution comprising dissolved therein a dispersing agent.

A free-radical forming polymerisation initiator may be present during the dispersing of the polymer-in-monomer solution in the aqueous solution of hydrophilic colloid. Preferably this polymerisation iniator is soluble in the monomer, and insoluble in water, although in some cases watersoluble initiators, such as potassium persulphate, may also be used. For practical reasons, however, the polymerisation initiator is not present during the dispersing step in order to prevent the polymerisation from starting already during this dispersing step. It is preferable to add the polymerisation iniator just before heating of the mixture to the polymerisation temperature.

The polymerisation initiator forming free radicals on heating is present in an amount comprised between 0.1 and 5% by weight based on the weight of liquid monomer present.

In principle any polymerisation initiator known in the art to form free radicals upon heating may be used, such as organic perioxides, e.g. benzoyl peroxide, methyl ethyl ketone peroxide, cyclohexanone peroxide, lauroyl peroxide, capryloyl peroxide and diacetyl peroxide, inorganic peroxides such as potassium persulphate and ammonium persulphate, azo compounds such as azo-bis-isobutyronitrile, and dialkyl peroxide carbonates such as diisopropyl peroxide carbonate.

The selection of the initiators depends on their temperature of decomposition and on the desired temperature of polymerisation, specified by the volatility of the monomer or the glass transition temperature of the final copolymer, but especially on their solubility. In order to initiate the polymerisation optimally in the polymer-in-monomer droplets and to form the least possible emulsion polymers, the initiators chosen have to be soluble preferably in the monomer phase and preferably, although not necessarily, insoluble in the aqueous phase.

Taking into account the aforesaid one can use methyl ethyl ketone peroxide or cyclohexanone peroxide for polymerisations at temperatures between 30° and 50° C, benzoyl peroxide and azobis-isobutyronitrile for polymerisations at temperatures between 50° and 80° C, whereas the high-temperature free-radical initiators such as p-chlorobenzoyl peroxide, di-tert.-butyl peroxide or dibenzal peroxide, only effective as catalysts in the higher temperature range, cannot be used.

Although for practical reasons a compound corresponding to the following formula is used exclusively as dispersing agent in the examples hereinafter:

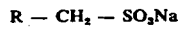

wherein R represents an unbranched alkyl group having 14 to 18 carbon atoms, any dispersing agent being sufficiently photographically inert can be used in principle. The above dispersing agent is marketed by Farbenfabriken Bayer in the form of a 70% aqueous solution under the trade name MERSOLAT H.

Other dispersing agents that can be used are:
1. non-ionogenic:
HEXAPON D : trade name of Société Chimique Elbeuvienne for a product according to the formula :

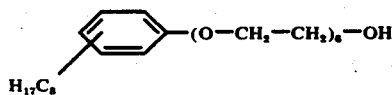

ADJUPAL A : trade name of Adjubel for a product according to the formula:

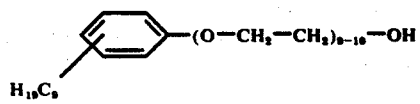

SPAN 85 : trade-name of Atlas for a sorbitan-trioleate

BRY 78 : trade-name of Atlas for a product according to the formula:

wherein R represents stearyl 2. anionic :
ULTRAVON W : trade-name of Ciba for a product according to the formula :

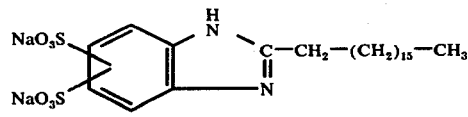

HOSTAPON T: trade-name of Farbwerke Hoechst for a product according to the formula:

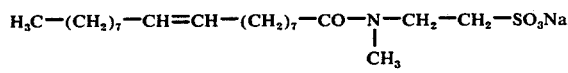

DOWFAX 2A1 : trade-name of Dow for dodecylated oxydibenzene disodium disulfonate.

AEROSOL 22 : trade-name of American Cyanamid Corp. for a product according to the formula:

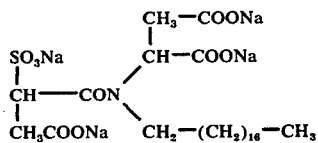

3. cationic :
ARQUAD 12 : trade-name of Armour & Co for a product according to the formula:

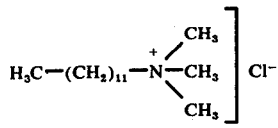

TRITON X400 : trade-name of Rohm & Haas for a product according to the formula:

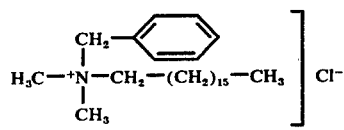

4. amphoteric :
AMPHIONIC D : trade-name of Glovers Chemicals Ltd. for a product according to the formula:

wherein:
R represents an alkyl group comprising 6 to 18 carbon atoms
x represents an integer from 1 to 4.

SOLUTIONSALZ B : trade-name of B.A.S.F. for a product according to the formula:

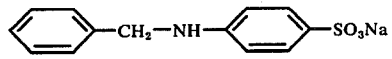

and the tetraethylpyrophosphate marketed by Albright & Wilson according to the following formula:

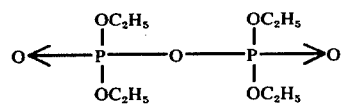

The dispersing of the polymer-in-monomer solution in the aqueous solution of hydrophilic colloid is performed by stirring. The rate of stirring greatly influences the particle size of the polymer-in-monomer solution droplets.

Simple stirring of the aqueous solution while adding the polymer-in-monomer solution, usually results in a far too heterogeneous distribution of droplets sizes so that upon polymerisation the sizes of polymer particles would also be too heterogeneous. So it is preferable to effect dispersion of the polymer-in-monomer solution in an aqueous solution of a hydrophilic colloid, by means of a commercially available dispersing apparatus, the rate of stirring and the stirring technique used being of great importance. Very interesting results have been obtained with the continuous flow mixing apparatus described in our United Kingdom Patent Application 15,950/70 filed Apr. 3, 1970 by Agfa-Gevaert N.V. This apparatus comprises a central rotor and a casing or housing surrounding the mantle surface of the rotor. The housing and rotor are arranged co-axially to form a clearance or layer space in the form of an annular passage having a section continuously decreasing in a direction perpendicular to the axis of revolution. The end of larger cross-section of the layer space serves as the inlet for the mixing zone that is formed between the mantle of the rotor and the surrounding surface of the housing, and the end of smaller cross-section serves as the outlet for the mixing zone. The facing walls defining the layer space are non-perforated, smooth or helicoidally grooved or have a roughness and/or dot-like protuberances that contribute to create turbulence in a liquid that is forced to pass through the clearance. The rotor and/or the housing are provided with actuating means for its or their rotational movement about the axis. At the zone of larger section the housing has an extension, via which liquid material can be fed into the apparatus and the top surface of the rotor at the inlet end has a surface free from guiding slots which could isolate separate portions of the liquid.

In the following paragraphs will be described more detailedly the dispersion in an aqueous gelating solution comprising a dispersing agent, of a solution of polymethyl methacrylate having a molecular weight of about 85,000 dissolved in monomeric methyl methacrylate. The same reasoning, however, can be applied combinations of other hydrophobic polymers of varying molecular weights dissolved in liquid, water-insoluble monomers.

With respect to polymethyl methacrylate of molecular weight of about 85,000 dissolved in methyl methacrylate it has been found experimentally that very interesting dispersions are obtained when the ratio by weight of dissolved polymethyl methacrylate to methyl methacrylate is comprised between 0.25 and 0.4 and preferably is about 0.3. The upper limit is governed by the viscosity of the polymer-in-monomer solution. For polymers of the same molecular weight an increasing of the ratio of dissolved polymethyl methacrylate, of course, results in an increase in viscosity of the solution. When this ratio exceeds 0.4, the solution is too viscous so that it becomes impossible to produce a homogeneous dispersion of droplets of 1 to 10 micron, preferably of 2 to 6 micron.

The lower limit is defined by the polymerisation conditions of the liquid monomer. It has been found that in the case of polymethyl methacrylate dissolved in methyl methacrylate, beneath a ratio by weight of 0.25, agglomerates are formed during polymerisation of the monomer, so that also the polymer particles formed become unsuitable for use as matting agents.

During the polymerisation the total content of polymer and monomer in the aqueous dispersion of hydrophilic colloid has a great influence on the agglomeration. A small amount of polymer-in-monomer solution per kg of dispersion does not change the quality of the final dispersion at all during the polymerisation. For economical reasons, however, it is important to use the highest possible concentration. The higher the total concentration of polymer and monomer, the higher is the viscosity of the reaction medium. This increase in viscosity causes the droplets to be subjected to higher friction forces during the dispersion and consequently they will be smaller. Moreover these droplets are cooled less easily and thus will give rise more easily to undesired agglomeration as a result of their poorer mobility in the viscous medium during the exothermic phase in the after-polymerisation of the monomer.

For economical reasons it can thus be put that the minimum amount of polymer-in-monomer solution during the polymerisation should exceed 50 g per kg of dispersion, whereas for reasons of quality it has been established experimentally that the maximum amount of polymer-in-monomer solution should be smaller than 150 g per kg of dispersion. The optimum value is approximately 100 g of polymer + monomer per kg of dispersion.

The presence of the hydrophilic colloid, i.e. gelatin in the aqueous phase also has an influence on the droplet formation during the dispersing. It has been found experimentally that with increasing concentration of the gelatin during the dispersing the mean diameter of the liquid droplets diminishes and that the stability of the dispersion increases, but also that an increasing gelating concentration results in an increase of the agglomeration during the subsequent polymerisation.

These phenomenons can probably be explained as follows. During the dispersing spherical particles are formed, the nucleus of which is composed mainly of liquid monomer, which is surrounded by an envelope of the film forming polymer. This envelope is formed during the dispersing, when the monomer dissolves in the water in the neighbourhood of the interface between the aqueous and the non aqueous phase. The solubility of methyl methacrylate in water at 40° C is 1.43%. This is sufficient to enchance the concentration of polymer at the interface, so that eventually a protecting polymer envelope is formed. The addition of gelating considerably enhances the solubility in water of the methyl methacrylate and also increases the viscosity of the reaction medium. By the greater friction forces during the dispersing smaller particles are formed again. The monomer dissolved in aqueous gelating may promote the agglomeration during the after-polymerisation. The amount of dissolved monomer as well as the chances for the formation of agglomerates increase with rising gelating content.

On the other hand it has also been found experimentally that in the case of too small a concentration of gelatin the dispersion during the preparation of the very dispersion as well as during the subsequent polymerisation is not sufficiently stable so that agglomerates are formed. The amount of gelatin per kg of dispersion can vary between 10 and 50 g and the optimum amount of gelatin averages 25 g of gelatin per kg of dispersion in the case of a polymethyl methacrylate having a molecular weight of approximatively 85.000. After polymerisation of the polymer-in-monomer droplets, the optimum amount of gelatin being used preferably, it is advisable to stabilize the polymer dispersion even further and simultaneously to adapt the viscosity of the dispersion to the coating conditions, by the addition of an increased amount of gelatin. Moreover, a small amount of preserving agent for gelatin can be added e.g. a small amount of a 20% solution of phenol in ethanol.

The dispersing agent also has an important influence on the results obtained. The purpose of the dispersing agent is to avoid any formation of agglomerates during the dispersion of the polymer-in-monomer solution in water to droplets of the desired size as well as during the polymerisation of these droplets. In the first case, i.e. during the dispersing of the polymer-in-monomer solution, the dispersing agent as a result of repulsion should prevent the droplets from agglomerating. A certain amount of dispersing agent is required therefor. It has been found that in order to obtain a homogeneous dispersion and a dispersion remaining stable during the pumping or stirring at approximatively 60° C, 0.1 g to 0.9 g of MERSOLAT H is required per 100 g of polymer-in-monomer solution. In the case of amounts lower than 0.1 g the dispersion is not sufficiently stable, since the tendency towards agglomeration increases by the insufficient repulsion. So an important weight fraction of droplets larger than 6 micron is obtained in this case, even when the flow and all other variables in the continuous flow mixing apparatus used for the dispersing step remain the same. In the case of 0.9 g and more the dispersion becomes too unstable during the pumping and the weight fraction of particles smaller than 2 micron increases considerably. An optimum amount during the dispersing step is approximatively 0.4 g per 100 g of polymer-in-monomer solution.

During the subsequent polymerisation and in order to avoid the formation of agglomerates a larger amount of dispersing agent is required than that necessary for the dispersing of the polymer-in-monomer droplets. At least the critical micel concentration of the dispersing agent used has to be reached. In this case the dissolved monomer can diffuse from the aqueous phase towards the "monomer-dispersing agent"-micels formed, whereby the monomer which is not encased in the polymer-in-monomer droplets is transformed into small latex particles which excludes the possibility of agglomeration but that are not suitable for matting purposes.

It has been found that during the polymerisation between 0.4 g and 8.0 g of MERSOLAT H should be present per 100 g of polymer-in-monomer solution. In the case of 0.4 g and less during the polymerisation agglomerates are formed, whereas in the case of amounts exceeding 8.0 g the number of particles having a diameter less than 2 microns increases considerably. Indeed, as a result of a higher concentration of dispersing agent, the interfacial surface tension between the dissolved phase (methyl methacrylate) and the dispersed phase (droplets consisting of polymethyl methacrylate and methyl methacrylate) is lowered, so that more methyl methacrylate is transferred from the droplets to the gelatin-water phase, which results in an increase of the latex fraction and a decrease of the diameter of the previously prepared dispersion of polymer-in-monomer droplets. An optimum amount of dispersing agent during the polymerisation is approximatively 3.5 g per 100 g of polymethyl methacrylate plus methyl methacrylate.

This amount of 3.5 g of MERSOLAT H per 100 g of polymethyl methacrylate + methyl methacrylate is far beyond the amount required for dispersing the polymer-in-monomer droplets. So for quality reasons, it is necessary to add a larger amount of dispersing agent for the polymerisation but after the dispersing step. In this way an amount of latex particles having a diameter beneath 0.05 micron is formed together with the particles required as matting agents. These latex particles however, have no disturbing influence, when the coating composition is used in photographic materials for the application of matting layers. They are photographically inert and have almost no influence on the brightness of the material.

The above-mentioned numbers relate to a system, wherein polymethyl methacrylate is dissolved in methyl methacrylate and wherein this solution is dispersed in an aqueous gelatin solution in the presence of MERSOLAT H, whereafter polymerisation of the dispersed droplets occurs. For all other combinations of polymers, monomers, dispersing agents, and hydrophilic colloid, such values can be found by simple testing.

When the polymer differs from the monomer, wherein it is dissolved graft copolymers can be formed in certain cases. The process of the invention, does not depend on the fact whether graft copolymers are obtained or not. The purpose of the invention is to form a polymer dispersion with very narrow distribution of the size of the polymer particles formed, whatever the composition of these very particles may be.

The most important characteristic of the particle dispersions according to the invention is that hard polymer pearls without an encased amount of solvent are obtained, so that agglomeration after polymerisation and during coating of the matting layer are excluded. An other advantage is the fact that the matting particles can be obtained with a very narrow distribution of the polymer particle sizes. Indeed, particles having diameters between 1 and 6 micron are prepared. A great number of them have a diameter comprised between 2 and 4 micron.

The aqueous dispersions of polymer particles according to the invention, if necessary after adaption of their concentration, are incorporated by stirring into an aqueous binder solution, which can be provided with the usual coating additives. From this coating composition a protective layer is coated on the light-sensitive silver halide emulsion layer and/or on the rear side of the photographic element according to known coating methods.

The protective layers should have a thickness of 0.5 to about 3 micron so that in fact a great number of the particles protrude from the surface of the protective layer and gave it a matted and rough appearance. They do not have a deleterious influence on the light-sensitive silver halide emulsion layers and can be applied to any type of black-and-white and colour photographic silver halide emulsion layer, filter layers, antihalation layers or non-curling layers. They may be used to reduce the sticking tendency of the photographic material, e.g. when the material is to be stored or packed in the form of a roll or stack. They may be used to provide sufficient surface roughness to prevent the formation of Newton's rings during printing enlarging operations, because the contact surface of the photographic material with another material is reduced. Further, they may be used to reduce abrasion by dry-friction and to reduce the tendency of scratching when materials are stored or packed in contact with another material as is the case e.g. with X-ray materials packed without interleaves. It is also possible to use the matting agents in order to obtain the desired coefficient of friction for film materials intended for use in apparatus for rapid handling and transport. Moreover, the matting agents may have in some cases a slight effect in that they reduce the generation of static electricity in photographic elements, since a rough surface is obtained and therefore the contacting surface of the photographic element with other materials, which might cause static discharges, is reduced.

The invention is illustrated by the following examples.

EXAMPLE 1

In a first vessel 5.54 kg of polymethyl methacrylate having a molecular weight of 85,000 and 18.46 kg of methyl methacrylate were stirred at room temperature for 1 hour and then at 50° C for another hour. A homogeneous solution was formed.

In another vessel were introduced 6 kg of gelatin, 29.9 l demineralized water and 103 g of MERSOLAT H 70% (trade name) and the whole was stirred for 1 hour to allow the gelatin to swell. The mixture was then heated at 50° C.

After complete dissolution, the contents of the first vessel were added with stirring in 2–3 minutes. Heating at 47°–48° C was continued. A relatively unstable coarse predispersion was obtained.

This coarse dispersion was introduced at a temperature of 47°–48° C in a continuous flow mixing apparatus as described in our United Kingdom Patent Application 15,950/70. The clearance between the rotor and the housing was adjusted at 1.9–2.1 mm and the rotor turned at 600–650 rounds per minute. The uniform dispersion of polymer-monomer droplets formed was catched in a polymerisation vessel wherein 0.63 kg of MERSOLAT H 70% in 150 l of demineralized water at about 45° C was present.

50 kg of the dispersion was collected from the continuous flow mixing apparatus in a 70% MERSOLAT H solution in approximatively 1 hour with slow stirring in the polymerisation vessel. In the mean time the polymerisation vessel was rinsed, with a nitrogen current of 5 l per min. As soon as approximately 50 kg of dispersion were present in the polymerisation vessel, 0.154 kg of dibenzoylperoxide were added at once. The temperature of the polymerisation vessel was then regulated as follows:

1 hour at 50°–55° C : the reaction temperature rose to 50° C 1 hour at 60°–65° C : the reaction temperature rose to 61° C 1 hour at 65°–70° C : the reaction temperature remained 61° C 1 hour at 75°–80° C : the reaction temperature rose to 67° C.

After this period 13 kg of gelatin were added and the stirring rate was enhanced to approximatively 50 revolutions per min. The stirring was continued for 15 min. and 1 l of an alcoholic phenol solution was added as preserving agent.

The dispersion was then filtered while warm through a nylon screen of 50 micron.

The resulting product chilled to form a white gel with a very weak odour of methyl methacrylate. The dispersion contained approximatively 36 g of matting particles per kg. The particle distribution was checked in a Coulter Counter.

The distribution of the particle sizes can be deduced from the diagram. In this diagram curve I represents the distribution curve of polymer particles obtained according to the process of the invention. Curve II belongs to a comparison system as described hereinafter. It appears from curve I that most of the polymer particles obtained according to the process of the invention have a diameter of approximatively 4.5 micron and that approximatively 96.7% by weight of the polymer particles have a diameter of 1.75 to 6.25 micron.

For comparison the particle size distribution (curve II) of the following system is given. Polymethyl methacrylate having a molecular weight of approximatively 85,000 was dissolved in ethyl acetate and then dispersed in an aqueous gelatin solution in optimum conditions. It appears from curve II that in this case only 82.6% by weight of the polymer particles have a diameter of 1.75–6.25 micron. Approximatively 1.2% by weight of the particles have a diameter smaller than 1.75 micron whereas the remainder, approximatively 16.2L%, is composed of particles having a diameter of 12–15 micron, which is inacceptable for protective layers. Since in the particles, however, residual solvent, in casu ethyl acetate remains present, agglomeration occurs easily during the subsequent coating operation, thus resulting in an undesirable cloudiness of the protective layer obtained.

A gelatin silver bromoiodide (2 mole % of iodide) X-ray emulsion comprising per kg 80 g of gelatin and an amount of silver halide corresponding to 190 g of silver nitrate was coated on both sides of a subbed cellulose triacetate support at a ratio of about 27 sq.m (per side of support) per kg of emulsion.

At both sides of the support, the emulsion layers while still wet were covered with a gelatin antistress layer from the following coating composition:

| | |
|---|---|
| gelatin | 30 g |
| sodium diisooctyl sulphosuccinate (5 % aqueous solution) | 28 ml |
| antistatic agent | 2 g |
| formol (4 % aqueous solution) | 30 ml |
| matting agent | 28.8 g |
| water until | 1000 ml |

A 10% aqueous solution of ethoxylated ricinoleic acid containing 40% of ethylene oxide groups was used as antistatic agent.

As matting agent the dispersion of polymethyl methacrylate particles as prepared above according to the process of the invention, was used.

The gelatin antistress layers were coated at a ratio of 1.1 g of gelatin per sq.m.

The photographic material thus formed was compared with a material prepared in an analogous way but comprising as matting agent a dispersion of polymethyl methacrylate particles prepared by dispersing in water a solution of the polymer in ethyl acetate (curve II of the diagram).

The latter material, unlike the material according to the invention, had an undesirable milky appearance.

The antistatic properties of the photographic material of the invention were also investigated. They were determined on the one hand by measuring the triboelectric charging of the photographic X-ray film material by rubbing against rubber, packaging of interleave paper and brass and on the other hand by estimating the discharge images produced in the emulsion layer by the sparks formed on rubbing the material in the dark against rubber, brass, polyvinyl chloride and intensifying lead screens, whereupon the light-sensitive material was developed to make visible the discharge images produced. In both cases the antistatic properties proved to be excellent.

EXAMPLE 2

A longitudinally stretched (3.5 times) polyethylene terephthalate film was covered with the following subbing layer composition at a ratio of 70 sq.m/liter:

| | |
|---|---|
| latex | 420 ml |
| gelatin | 30 g |
| sodium salt of sulphosalicylic acid | 12 g |
| 20 % aqueous solution of adipic acid | 120 g |
| 10 % aqueous solution of ULTRAVON W (trade name) | 6 ml |
| water | 574 ml |

The latex used has a concentration of 20% by weight and was obtained by the emulsion polymerisation of vinyl chloride, vinylidene chloride, n-butyl acrylate and itaconic acid (63:30:5:2% by weight) such as described in United Kingdom Patent Specification 1,234,755 filed September 28, 1967 by Gevaert-Agfa N.V. ULTRAVON W is the trade-name of CIBA AG, Switzerland, for a dispersing agent consisting of the disodium salt of heptadecyl-benzimidazole disulphonic acid.

After drying of the coating the film was stretched to 3.5 times in the transverse direction at a temperature of about 87° C.

The thus subbed polyethylene terephthalate film support was substituted for the subbed cellulose triacetate film support, used in Example 1.

The same good results were obtained.

EXAMPLE 3

In a first vessel 150 g of polystyrene having a molecular weight of 40,000 were dissolved in 250 g of styrene by stirring at room temperature for 1 hour.

In a second vessel were introduced 100 g of gelatin, 1.71 g of MERSOLAT H 70% (trade name) and demineralised water was added to a total weight of 600 g.

The contents of the first vessel were dispersed in the second one, according to the process and with the apparatus described in Example 1, whereafter polymerisation occurred in the following mixture:

| | |
|---|---|
| dispersion (as prepared above) | 1000 g |
| MERSOLAT H 70 % | 12.5 g |
| benzoyl peroxide | 2.50 g |
| demineralised water | 3000 g |

The polymerisation vessel was heated for 1 hour at 50° C, 1 hour at 55° C, 1 hour at 60° C and 1½ at 75° C with slow stirring. Subsequently, 260 g of gelatin were added to the dispersion.

The dispersion contained 4.5 g of polystyrene particles having a diameter of 2 to 5 micron per 100 g of dispersion.

The process of Example 1 was then repeated, a silver halide emulsion layer being coated on both sides of a subbed cellulose triacetate film. The protective layer of Example 1, however, was replaced by a layer in which the dispersion of polymethyl methacrylate particles was replaced by a dispersion of polystyrene particles as prepared above.

The same good results were obtained.

EXAMPLE 4

The process of Example 3 was repeated with the sole difference that the polymerisation initiator benzoyl peroxide was replaced by a same amount of potassium persulphate. The dispersion formed contained 4.16 g of polystyrene particles, having a diameter comprised between 2 and 5 micron, per 100 g of dispersion.

When this dispersion was used in a protective coating composition as described in Example 1, the same good results were obtained.

EXAMPLE 5

The process described in Example 1 was repeated. The first vessel contained 109.2 g of polymethyl methacrylate (molecular weight 85,000) dissolved in 290.8 g of styrene. The second vessel contained 100 g of gelatin, 1.71 g of MERSOLAT H 70% and distilled water to a total weight of 600 g. The dispersing of both contents occurred as described in Example 1 whereafter polymerisation of the following mixture took place:

| | |
|---|---|
| dispersion (as prepared above) | 1000 g |
| MERSOLAT H 70 % | 12.5 g |
| benzoyl peroxide | 2.9 g |
| demineralised water | 3000 g |

During polymerisation the heating was as follows:
1 hour at 50° C,
16 hours at 60° C,
2 hours at 75° C,
and after polymerisation 260 g of gelatin in 80 ml of water were added for stabilization purposes.

The dispersion contained 4.5 g of polystyrene/polymethyl methacrylate particles (diameter between 2 and 6 micron) per 100 g of dispersion.

When this dispersion was worked up in a protective layer on light-sensitive photographic silver halide emulsion layers as described in Example 1, the same good results were obtained.

EXAMPLE 6

In a first vessel were introduced 400 g of polymethyl methacrylate having a molecular weight of 85,000 and 1000 g of methyl methacrylate. The resulting mixture was stirred until a clear solution was formed.

In a second vessel were introduced at 50° C 58.5 g of polyethylene oxide having a molecular weight of 600,000. 6.69 g of MERSOLAT H 70%, and 2287 ml of water.

The contents of the two vessels were dispersed according to the method and with the apparatus of Example 1, whereafter polymerisation of the following mixture took place:

| | |
|---|---|
| dispersion (as prepared above) | 1000 g |
| MERSOLAT H 70 % | 11.6 g |
| benzoyl peroxide | 2.89 g |
| demineralised water | 2990 g |

During the polymerisation the dispersion was stirred according to the following reaction scheme:
1 hour at 50° C,
2 hours at 60° C,
2 hours at 80° C.

The polymer dispersion thus obtained was used for applying antistress layers to photographic film materials as described in Example 1.

The same good results were obtained.

EXAMPLE 7

A biaxially oriented polyethylene terephthalate film support of 65 μm, was provided on both sides with a known subbing layer composition. For application in microphotography an antihalation layer was applied to the rear side of the support and this layer was covered with an antistatic layer comprising matting agents which had been obtained according to the process of the invention.

The antihalation layer was applied at 47 sq.m/litre from the following coating composition:

| | |
|---|---|
| copolymer of styrene and acrylic acid (70:30 % by weight) | 25 g |
| triphenylmethane dye of the formula | 4.6 g |

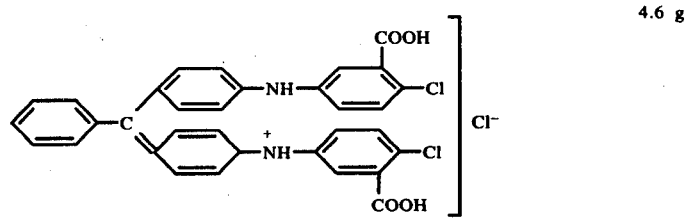

triphenylmethane dye of the formula

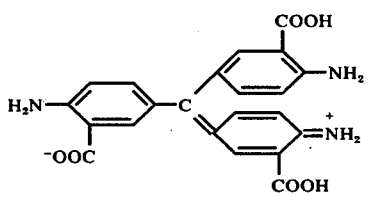

azomethine dye of the formula

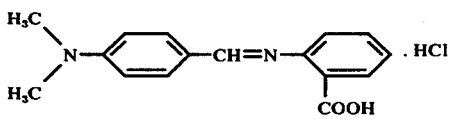

| | |
|---|---|
| ethanol | 260 ml |
| n-propanol | 200 ml |
| ethylenechlorohydrin | 40 ml |
| acetone | 500 ml |
| 35 % by weight aqueous solution of hydrochloric acid | 1.5 ml |

The dried antihalation layer was coated with an antistatic layer form the following coating composition, at 30 sq.m/litre :

| | |
|---|---|
| mono-sodium salt of the copolymer of styrene and maleic acid | 4 g |
| starch | 3.8 g |
| HEXAPON D (trade-name) | 0.7 g |
| 30 % by weight dispersion of polymethyl methacrylate matting agent | 1.5 ml |
| distilled water | 850 ml |
| isopropanol | 150 ml |

The starch used was a potato-starch sold by Pfersee, Augsburg, Germany, under the trade-name RABIC, and the matting agent was a dispersion of polymethylmethacrylate prepared according to the process of the invention as described in Example 1.

When the photographic material was kept in rolled form, storage tests proved that the photographic deviations found were negligible. Indeed, the contact between the back layer and the emulsion layer was reduced to a minimum by the presence of the matting particles in the antistatic layer.

During the photographic processing the antihalation layer and the antistatic layer were eliminated by dissolution in the photographic baths. As a consequence the matting particles also disappeared, which is of utmost importance in the case of microfilms. Indeed, in this way the matting particles cannot adversely affect the sharpness of the resulting images any longer.

We claim:

1. Light-sensitive photographic materials comprising a support, a light-sensitive silver halide emulsion layer and a water-permeable protective layer exteriorly to said emulsion layer, said protective layer being formed from a hydrophilic coating composition containing an aqueous binder solution and a homogeneous aqueous dispersion of polymer particles, said dispersion prepared by dissolving a water-insoluble, film-forming polymer in a water-insoluble ethylenically unsaturated monomer which is liquid at room temperature to provide a solution thereof, dispersing by stirring the solution thus formed in an aqueous solution of a hydrophilic colloid and dispersing agent, the stirring being continued until a stable dispersion of polymer-in-monomer solution droplets having a diameter between 1 and 10 micron is formed in said aqueous solution and, while continuously stirring in the presence of a free-radical forming polymerization initiator, heating the dispersion to the decomposition temperature of said polymerization initiator to effect polymerization of said water-insoluble liquid monomer and to form an aqueous dispersion of solvent-free polymer particles, said unsaturated monomer being selected so as to be a solvent at room temperature for said film-forming polymer, and to provide upon said polymerization in the presence of said film-forming polymer, polymer particles having a glass transition temperature of at least 60° C., and said binder of said aqueous binder solution when in an aqueous solution being compatible with said dispersion.

2. Light-sensitive photographic materials of claim 1 wherein in said hydrophilic coating composition the polymer-in-monomer solution droplets obtained after dispersion have a diameter between 1 and 6 micron.

3. Light-sensitive photographic materials of claim 1 wherein in said hydrophilic coating composition the water-soluble film-forming polymer is polymethyl methacrylate or polystyrene and the water insoluble ethylenically unsaturated monomer is methyl methacrylate or styrene.

4. Light-sensitive photographic materials of claim 1 wherein said hydrophilic coating composition the hydrophilic colloid is gelatin or polyethylene oxide.

5. Light-sensitive photographic material of claim 1 wherein said hydrophilic coating composition the dispersing agent has the formula:

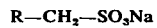

wherein R is a straight chain alkyl group of 14 to 18 carbon atoms.

6. Light-sensitive photographic materials of claim 1 wherein said hydrophilic coating composition from 0.1 to 5 percent by weight of water-insoluble film-forming polymer is dissolved with respect to the weight of water-insoluble ethylenically unsaturated monomer.

7. Light-sensitive photographic materials of claim 1 wherein in said hydrophilic coating composition from 10 to 50 g of hydrophilic colloid is dissolved per 1000 g total weight of the dispersion.

8. Light-sensitive photographic materials of claim 1 wherein in said hydrophilic coating composition from 50 to 150 g of polymer-in-monomer solution is present per kilogram of the dispersion.

9. Light-sensitive photographic materials of claim 1 wherein in said hydrophilic coating composition during the dispersion of polymer-in-monomer solution in the aqueous solution of hydrophilic colloid, from 0.1 to 0.9 g of dispersing agent is present per 100 g of dispersion.

10. Light-sensitive photographic materials of claim 1 wherein in said hydrophilic coating composition during polymerization from 0.4 to 8.0 g of dispersing agent is present per 100 g of dispersion.

11. Light-sensitive photographic materials of claim 1 wherein in said hydrophilic coating composition from 0.1 to 5.0 percent by weight of polymerization initiator with respect to the weight of water-insoluble, ethylenically unsaturated monomer is present.

* * * * *